United States Patent Office 2,915,416
Patented Dec. 1, 1959

2,915,416

INK COMPOSITION

Fred William West, Ridgefield, N.J., assignor, by mesne assignments, to Minnesota Mining and Manufacturing Company, St. Paul, Minn., a corporation of Delaware No Drawing. Application September 16, 1953
Serial No. 380,584

24 Claims. (Cl. 117—65)

This invention relates to halogen-containing plastics. In one of its aspects, this invention relates to an ink for marking chlorinated plastics. In another of its aspects, this invention relates to a process for applying the ink to chlorinated thermoplastic polymers. In one of its more particular aspects, this invention relates to an ink for marking plastic polymers of trifluorochloroethylene and to a method of applying these inks.

Because of their unusual chemical and physical characteristics, the fluorine-containing thermoplastic polymers are widely used in numerous industrial applications, where their properties are best exploited. Among the most outstanding of the properties of the fluorine-containing thermoplastic polymers, such as polymers of trifluorochloroethylene, is chemical inertness. Thus, thermoplastic polymers of trifluorochloroethylene may be exposed to a variety of oxidizing and reducing agents such as nitric acid, hydrazine, hydrogen peroxide, etc., with no apparent effect. In addition to their high degree of chemical inertness, these polymers possess high heat stability, excellent electrical properties and are readily molded into various useful items.

In many of the applications in which industrial users employ these plastic polymers, it is desirable and sometimes necessary that the polymer be marked or colored. Thus, in electrical insulation applications where the polymer is used to insulate the individual conductors in a multi-conductor cable some method of color-coding must be used. In addition, manufacturers frequently desire to apply trademarks or other indicia to the article that they fabricate. Although there is available today a wide variety of inks, none has been found which will satisfactorily mark the plastic polymers of trifluorochloroethylene. Some ink formulations smudge on contact with the polymer, while others chip or offset after application.

It is an object of this invention to prepare a new ink formulation.

It is another object of this invention to provide an ink which can be used to mark chlorinated plastics.

It is another object of this invention to provide an ink which will permanently mark polymers of trifluorochloroethylene.

It is another object of this invention to provide an ink which will set quickly at high temperatures and which will not smudge or offset.

It is another object of this invention to provide an ink which will adhere to polymers of trifluorochloroethylene.

It is still another object of this invention to provide an ink which is stable at high temperatures.

A further object of this invention is to provide an ink for marking wire-coating fabricated from polymers of trifluorochloroethylene.

A still further object of this invention is to provide a process for applying an ink to chlorine-containing plastics.

Various other objects and advantages of the present invention will become apparent to those skilled in the art, on reading the accompanying description and disclosure.

In general, the process of this invention is effected by applying to the plastic that is to be marked, an ink prepared by admixing a suitable pigment with a liquefiable polymer of trifluorochloroethylene, and subsequently heating the marked plastic at an elevated temperature to set the ink. The term polymer as used herein includes both homo-polymers and co-polymers.

The liquefiable polymers of trifluorochloroethylene, which serve as vehicles in the ink of this invention are prepared by polymerization of the monomer trifluorochloroethylene to produce oils, greases and soft waxes. Preferred vehicles are the oils or normally liquid polymers since most marking processes are based on the use of liquid composition. The greases and soft waxes are particularly suited for use in marking processes which require non-liquid compositions and may be dissolved in solvents where liquid compositions are required. The greases and soft waxes have softening points below 150° C. and preferably below about 100° C. Usually, homo-polymers of trifluorochloroethylene are preferred since they are more readily applied to a wider variety of materials. However, copolymers, in the oil, grease and soft wax range, of trifluorochloroethylene copolymerized with halogenated olefins such as vinyl chloride, vinyl fluoride, vinylidene fluoride, dichlorodifluoroethylene, trichloroethylene etc. may also be used as vehicles and their use is within the scope of this invention.

A preferred liquid homopolymer of trifluorochloroethylene, is that which is generally known as telomer oil. The telomer oil is prepared by directly telomerizing or polymerizing the monomer trifluorochloroethylene with a catalyst, such as benzoyl peroxide, in the presence of sulfuryl chloride as the telogen to produce a substantially saturated telomer oil. The telogen, sulfuryl chloride, provides chlorine terminal groups, tends to control telomerization and terminates free radical reaction so that by varying the amount of telogen used, the telomeric material may be obtained in the desired form, that is as an oil grease or wax, which is recovered as the product of the process.

The reaction occurs essentially as shown below:

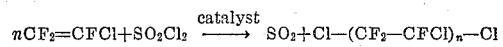

As shown, sulfur dioxide gas is formed as well as a clear polymeric mass, usually in gel-like form, which includes various grades of telomeric halocarbons, such as oils, greases and soft waxes. These telomeric halocarbons may be separated by conventional distillation. The distillable substances obtained by telomerizing chlorotrifluoroethylene compounds in the presence of sulfuryl chloride are sufficiently stable as not to absorb appreciable amounts of fluorine even though exposed to the gas for 24 hours at a temperature of 60° C. or to significantly pyrolytically decompose at temperatures up to 200° C. This process may also be used to prepare copolymers or co-telomers of trifluorochloroethylene with halogenated olefins.

The mol ratio of sulfuryl chloride to monomer employed in these procedures is between about 2:1 and about 1:10, preferably between 1:1 and 1:4 depending upon the products desired and the starting materials used. The optimum mol ratio for producing primarily telomeric chlorotrifluoroethylene oils and greases, is 1:2 of the telogen to monomer. The telomerization may be carried out in the presence of a suitable inert solvent, if desired. The term inert solvent means any liquid which does not materially alter the normal telomerization of haloethylenic compounds in the presence of sulfuryl chloride; such as Freon 113, tetrachloroethylene or tetrachloroethane. It should be noted that water slowly reacts with sulfuryl chloride to form hydrochloric acid and sulfuric acid and therefore precautions should be taken to provide substantially anhydrous conditions. Glass lined equipment is usually desirable, however Monel and stainless steel have been used for polymerization and filtration apparatus without noticeable corrosion.

The preferred liquid homopolymers of trifluorochloroethylene, are characterized by the presence in the molecule of an even number of carbon atoms and of chlorine terminal groups. Those liquid homopolymers or telomers, which are suitable to the process of this invention, contain between about 4 and about 15 monomer units in the chain. A typical analysis of the preferred liquid homopolymer shows a chlorine content of 31.1% and a fluorine content of 46.2%. The preparation of the above telomer is described in detail in pending application Serial No. 294,495 of William S. Barnhart, filed June 19, 1953, now U.S. Patent 2,770,659.

There is a difference between the various liquefiable homopolymers of trifluorochloroethylene depending upon the method by which they are prepared. Thus, while either telomer oil or cracked oil may be used interchangeably as a vehicle for marking non-fluorinated thermoplastics, such as vinyl chloride, vinylidene chloride, etc. noticeable differences in the quality of the mark were observed with respect to the fluorinated thermoplastics. Generally, the more highly fluorinated plastics were less satisfactorily marked with inks which contained cracked oil as a vehicle. For example when homopolymers of trifluorochloroethylene were marked with an ink which contained telomer oil as a vehicle a clear permanent mark was obtained whereas when cracked oil was used a somewhat fugitive mark resulted. The superiority of telomer oil in marking the more highly fluorinated thermoplastics is believed due to its high chlorine content which results in a more rapid and even penetration of the fluorinated surface to which it is applied. Since other theories may be advanced which explain the difference between these polymers, this theory should not be construed as necessarily limiting.

In the formulation of the inks which comprise this invention, any suitable pigment, dye or lake may be employed. The term pigment as used herein includes dyes, lakes and inorganic pigments. The pigment may be soluble or insoluble in the vehicle and, if insoluble, is preferably finely-divided and dispersed within the vehicle. Any colored material may be used although, generally, organic compounds are preferred over the inorganic compounds because their colors are more intense and, therefore, less is required. Illustrative of the organic pigments which may be employed are the various phthalocyanine, azo, anthraquinone benzidene and pyrazolone derivatives. A list of particularly suitable pigments is presented below in the table, although it is to be clearly understood that this list is representative and not necessarily limiting. These pigments are insoluble in the solvent and in the vehicle.

TABLE

|  | Common Name [1] | Reference to Structure [1] | Chemical Name | General Structure |
|---|---|---|---|---|
| (1) | Phthalocyanine Blue | Karrer's Organic Chemistry, Pgs. 788–789, 4th Edition. | Copper-phthalocyanine | Phthalocyanine pigment. |
| (2) | Phthalocyanine Green | do | Chlorinated Copper-phthalocyanine. | Do. |
| (3) | do | do | Highly chlorinated Copper-phthalocyanine. | Do. |
| (4) | Benzidine Yellow Toner | Fig. 49, P. 391 | o-dichlorobenzidine bis alpha-(azo o-methyl alpha-aceto acetanilide). | Substituted benzidine acetanilide azo pigment. |
| (5) | do | Fig. 48, P. 391 | o-dichlorobenzidine bis alpha-(azo alpha-aceto-acetanilide). | Do. |
| (6) | do | Fig. 50, P. 392 | o-dichlorobenzidine bis alpha-(azo o,p-dimethyl-alpha-acetoacetanilide). | Do. |
| (7) | Dianisidine Orange Toner | Fig. 60, P. 397 | o-dianisidine bis alpha-(azo o-methyl-alpha acetoacetanilide). | Do. |
| (8) | do | Fig. 61, P. 397 | o-dianisidine bis alpha-(azo o,p-dimethyl alpha-acetoacetanilide). | Do. |
| (9) | do | Fig. 62, P. 398 | o-dianisidine bis alpha-(azo alpha-acetoacetanilide). | Do. |
| (10) | Lithosal Red 2-B | Fig. 91, P. 412 | Calcium salt of 2-hydroxy-3-carboxy-1-naphthyl azo ortho-(p-chloro-m-toluene sulfonic acid). | Phenyl-naphthyl azo pigment. |
| (11) | Benzidine Orange Toner | Fig. 51, P. 392 | o-dichlorobenzidine bis 4-(azo-1-phenyl-3-methyl-pyrazolone). | Substituted benzidine-pyrazolone azo pigment. |
| (12) | Vulcan Fast Red BA | Fig. 81, P. 407 | o-dichlorobenzidine bis 4-(azo-1-phenyl-3-ethyl carboxylate-pyrazolone). | Do. |
| (13) | Vulcan Fast Red G | Fig. 80, P. 407 | o-dianisidine bis 4-(azo-1-p-tolyl-3-methyl-pyrazolone). | Do. |
| (14) | Permanent Red F-4RH | Fig. 77, P. 405 | 1-(p-chloro-o-tolyl azo)-2-naphthol 3-amido-n-(p-chloro-o-methyl benzene). | Substituted phenyl-naphtyhl-toluidine azo pigment. |
| (15) | Permanent Red F 4R | Fig. 76, P. 405 | Ring structure similar to that of pigment (14). | Do. |
| (16) | Chloronitronaniline Red Toner. | Fig. 75, P. 404 | do | Do. |
| (17) | Nitroaniline Red Toner | Fig. 73, P. 403 | do | Do. |
| (18) | Toluidine Maroon Toner | Fig. 82, P. 408 | do | Do. |
| (19) | Nitroanisidine Maroon Toner. | Fig. 84, P. 409 | do | Do. |
| (20) | Indanthrene Blue | Karrer's Organic Chemistry, P. 601, 4th Edition. | N-N'-dihydro-1, 2, 1', 2'- dianthraquinone phenazine. | Dianthraquinone dye. |
| (21) | Indanthrene Orange RRTA | Fig. 126, P. 430 |  | Bromo-anthraquinone dye. |

[1] Unless otherwise indicated, references to structure may be found in J. J. Mattiello, Protective and Decorative Coatings, v. 5, chapter 4 (John Wiley and Sons, 1946).

Representative of the soluble pigments which may be employed are the various indigo dyes such as Ciba Yellow 3G, Brilliant Indigo 4B, Ciba Green G, Ciba Violet A, Helindon Orange R, etc. the Alizarine dyes such as Alizarine Cyanine Green, Alizarine Blue, Alizarine Orange and the quinoline dyes such as Chinoline Yellow.

These dyes are described and methods of preparation are given in Organic Chemistry by Fieser and Fieser, second edition, pages 907, 910–912 and 916–918.

The pigment is dispersed in the vehicle using any of the conventional blending techniques which are employed in the ink and paint industry. Thus, the pigment and the vehicle may be blended in a pebble mill, ball mill or any type colloid mill or the dispersions may be effected by using a three roll paint mill. The concentration of the pigment in the oil, will depend on the intensity of the color desired, the desired thickness of the ink mark and on the desired density of the ink preparation. Concentration of the ingredients is also based on the particular marking process which is to be employed e.g. silk screen, intaglio or stamp. Concentration generally, will be between about 1 and about 50% of the pigment in the vehicle while a preferred concentration is between about 5 and about 20%. Ink concentrates may contain up to about 70% pigment.

Depending upon the viscosity requirements of the process which is employed, the ink may be used with or without thinning agents. If thinners are required, then any organic solvent which is inert to the other ingredients of the ink, may be employed as a thinner. Illustrative of the various thinners which may be employed are ketones, such as acetone, cyclohexanone, methyl cyclohexanone; esters such as ethyl formate, butyl acetate, benzyl acetate; glycol ethers; and chlorinated hydrocarbons such as methylene dichloride, and ethylene dichloride; hydrocarbons of the benzene series such as benzene, toluene and xylene and aliphatic hydrocarbons. The thinner employed should be of low enough volatility so that it will evaporate from the ink quickly at the temperature at which the ink is applied to the plastic material.

The ink composition, with or without a thinner, is applied to the surface of the plastic by any of the conventional printing or marking processes. The marked plastic is then heated at a temperature between about 100° C. and about 375° C. for a period of time between about one second and about 30 minutes to set the ink. Preferably, the marked plastic is heated at a temperature between about 150° C. and about 200° C. for a period of time between about one and 10 minutes. If the ink contains a thinner the thinner is preferably allowed to evaporate before the heating operation is begun. In the marking of wire coatings rapid surface heating is usually required and thus air or gas temperatures between about 300° C. and about 375° C. may be necessary to set the ink in a short period of time. Any source of heat can be used in the application of these inks such as a hot blast of air or an inert gas, oven heat and infra-red heat.

The ink functions by penetrating the solid polymer mass and depositing in or below the surface of the polymer the incorporated pigment. The vehicle, that is the liquid polymer of trifluorochloroethylene, either volatilizes or diffuses through the polymer, leaving the pigment as a concentrated mass in or below the surface of the polymer.

In order to illustrate the process of this invention, the following examples are presented. The examples are representative of ink formulations which were prepared by dispersing the pigment in the oil in a three-roll paint mill and were successfully employed in marking a normally solid homopolymer of trifluorochloroethylene. These examples are offered for purposes of illustration and are not to be construed as necessarily limiting the invention.

*Example I*

Parts by weight

Permanent Red F-4RH _____ 10
Telomer oil _____ 90

*Example II*

Phthalocyanine Green _____ 10
Telomer oil _____ 80
Acetone _____ 10

The above inks were spread on an ink pad, and printing was done with rubber stamps on 5 mil polytrifluorochloroethylene film. The printed films were heated for two minutes in an oven set at 190° C. to develop adhesion. The ink mark was stable, did not smudge or crack, was permanent and did not offset when the inked surface was reheated.

Various modifications and alterations of the process of this invention will be apparent to those skilled in the art and may be used without departing from the scope of this invention.

Having thus described my invention, I claim:

1. A novel ink composition comprising a coloring phase consisting essentially of an organic coloring pigment and a sole polymer phase consisting essentially of a polymer of trifluorochloroethylene selected from the group consisting of oils, greases and waxes, said greases and waxes having a softening point below about 150° C.

2. The product of claim 1 in which the pigment is a phthalocyanine pigment.

3. The product of claim 1 in which the pigment is phthalocyanine blue.

4. The product of claim 1 in which the pigment is a substituted benzidene acetanilide azo pigment.

5. The product of claim 1 in which the pigment is benzidene yellow toner.

6. The product of claim 1 in which the pigment is a phenyl naphthyl azo pigment.

7. The product of claim 1 in which the pigment is Lithosal Red 2-B.

8. The product of claim 1 in which the pigment is a substituted benzidene pyrazolone azo pigment.

9. The product of claim 1 in which the pigment is Vulcan Fast Red.

10. The product of claim 1 in which the pigment is a dianthraquinone.

11. The product of claim 1 in which the pigment is a Indanthrene blue.

12. A novel ink composition consisting essentially of a coloring phase consisting essentially of an organic coloring pigment, a sole polymer phase consisting essentially of a polymer of trifluorochloroethylene selected from the group consisting of oils, greases and waxes, said greases and waxes having a softening point below about 150° C., and a volatile organic solvent which is inert to the ingredients of the ink.

13. The product of claim 12 in which the volatile organic solvent is tetrahydrofuran.

14. The product of claim 12 in which the volatile organic solvent is dioxane.

15. The product of claim 12 in which the volatile organic solvent is cyclohexanone.

16. The product of claim 12 in which the volatile organic solvent is ethylene dichloride.

17. A novel ink composition comprising a coloring phase consisting essentially of an organic coloring pigment in an amount between about 1 and about 50 weight percent and a sole polymer phase consisting essentially of a normally liquid polymer of trifluorochloroethylene.

18. A novel ink composition comprising a coloring phase consisting essentially of an organic coloring pigment in an amount between about 5 and about 20 weight percent and a sole polymer phase consisting essentially of a normally liquid homopolymer of trifluorochloroethylene.

19. A method for marking chlorinated polymers which comprises applying to the surface that is to be marked an ink comprising a coloring phase consisting essentially of an organic coloring pigment and a sole polymer phase consisting essentially of a trifluorochloroethylene polymer selected from the group consisting of oils, greases and waxes, said greases and waxes having a softening point below about 150° C., and maintaining the marked surface at a temperature between about 100° C. and about 375° C. for a period of time between about 1 second and 30 minutes.

20. A method for marking chlorinated polymers which comprises applying to the surface that is to be marked an ink comprising a coloring phase consisting essentially of an organic coloring pigment and a sole polymer phase consisting essentially of a trifluorochloroethylene polymer selected from the group consisting of oils, greases and waxes, said greases and waxes having a softening point below about 150° C., and maintaining the marked surface at a temperature between about 150° C. and about 200° C. for a period of time between about 1 minute and about 10 minutes.

21. A method for marking chlorinated polymers which comprises applying to the surface that is to be marked an ink comprising a coloring phase consisting essentially of an organic coloring pigment and a sole polymer phase consisting essentially of a trifluorochloroethylene polymer selected from the group consisting of oils, greases and waxes, said greases and waxes having a softening point below about 150° C., and maintaining the marked surface at a temperature between about 300° C. and about 375° C. for a period of time between about 1 and about 5 seconds.

22. An article comprising a surface of a solid polymer of a chlorinated olefin marked with an ink composition comprising a coloring phase consisting essentially of an organic coloring pigment and a sole polymer phase consisting essentially of a trifluorochloroethylene polymer selected from the group consisting of oils, greases and waxes, said greases and waxes having a softening point below about 150° C.

23. The marked article of claim 22 in which the chlorinated olefin is trifluorochloroethylene.

24. An article comprising a surface of a solid polymer of trifluorochloroethylene marked with an ink composition comprising a coloring phase consisting of an organic coloring pigment in an amount between about 1 and about 50 weight percent and a sole polymer phase consisting essentially of a trifluorochloroethylene polymer selected from the group consisting of oils, greases and waxes, said greases and waxes having a softening point below about 150° C.

References Cited in the file of this patent

UNITED STATES PATENTS

| | | |
|---|---|---|
| 2,636,908 | Dittman et al. | Apr. 28, 1953 |
| 2,649,382 | Vesce | Aug. 18, 1953 |
| 2,656,331 | Sprung | Oct. 20, 1953 |
| 2,722,038 | Freund | Nov. 11, 1955 |
| 2,823,146 | Roberts et al. | Feb. 11, 1958 |